United States Patent

[11] 3,599,262

[72] Inventors Victor H. Carder
 Carmel;
 Sheldon K. Green, Salinas; Christopher R. Wood, Salinas, all of, Calif.
[21] Appl. No. 30,454
[22] Filed Apr. 21, 1970
[45] Patented Aug. 17, 1971
[73] Assignee Cochran Western Corporation
 Salinas, Calif.

[54] ATTITUDE SENSING SYSTEM FOR USE DURING LOADING AND UNLOADING OF VEHICLES
 14 Claims, 14 Drawing Figs.
[52] U.S. Cl. ............................................ 14/71,
 214/38.22
[51] Int. Cl. ............................................ B65g 11/00,
 B65g 67/02
[50] Field of Search ............................................ 14/71;
 214/38.22

[56] References Cited
UNITED STATES PATENTS
3,038,185 6/1962 Moore ............................ 14/71

| | | | |
|---|---|---|---|
| 3,086,152 | 4/1963 | Lodjic | 14/72 X |
| 3,090,514 | 5/1963 | Black | 214/38.22 X |
| 3,263,832 | 8/1966 | Williams | 214/38.22 |
| 3,310,823 | 3/1967 | Preiss | 14/71 |
| 3,524,558 | 8/1970 | Mastracci | 214/38 |

*Primary Examiner*—Jacob L. Nackenoff
*Attorney*—Flehr, Hohbach, Test, Albritton and Herbert ABSTRACT: An electromechanical sensing system used in conjunction with a vehicle-loading bridge to automatically adjust the orientation of the bridge in accordance with changes in attitude of elevation and/or angular displacement of a vehicle during loading and unloading thereof. Means for raising or lowering the loading bridge or tilting its forward end to maintain the bridge properly aligned with an access door of a vehicle is controlled by signals from limit switches actuated by a linkage mechanism responsive to vehicle attitude changes. A four bar linkage mechanism is actuated by a sensor arm operatively engaged with the vehicle. The disclosed system has particular utility in conjunction with loading and unloading aircraft, but its utility with other cargo carrier-type vehicles also is recognized.

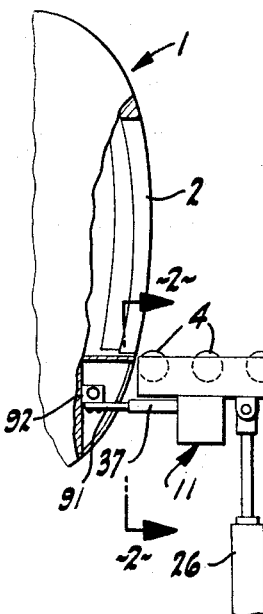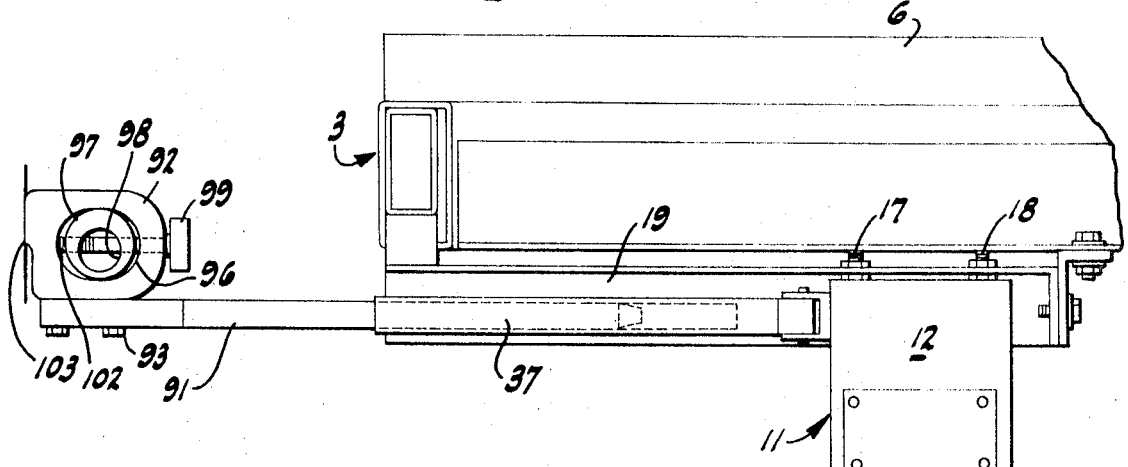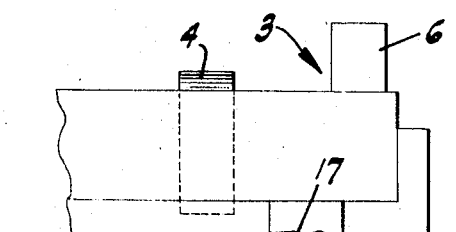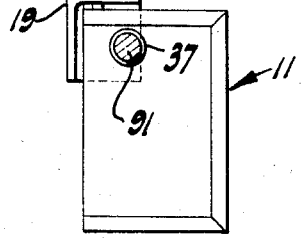

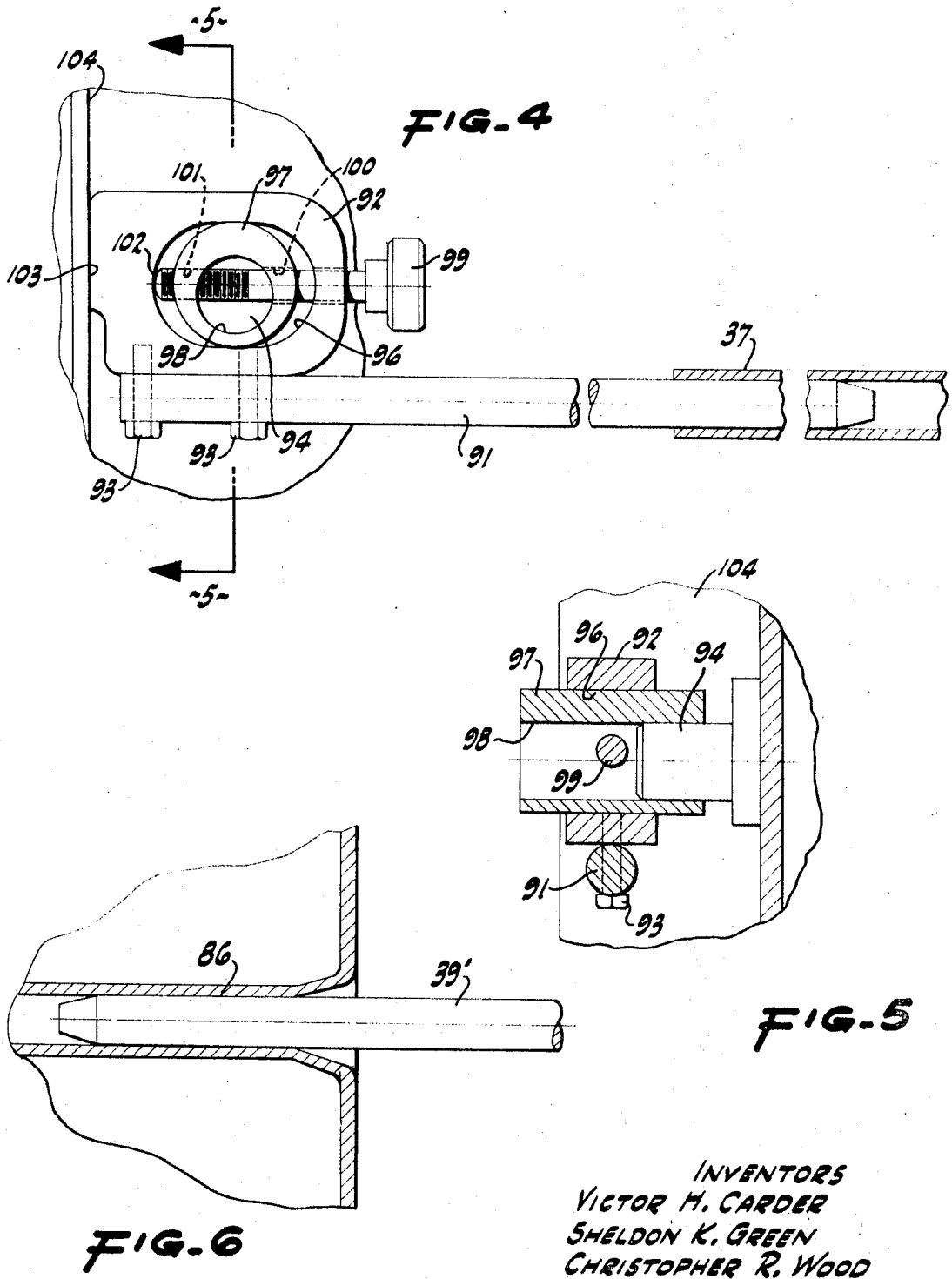

INVENTORS
VICTOR H. CARDER
SHELDON K. GREEN
CHRISTOPHER R. WOOD
By Flehr, Hohbach, Test,
Albritton & Herbert
ATTORNEYS INVENTORS
VICTOR H. CARDER
SHELDON K. GREEN
CHRISTOPHER R. WOOD
By Flehr, Hohbach, Test,
Albritton & Herbert
ATTORNEYS

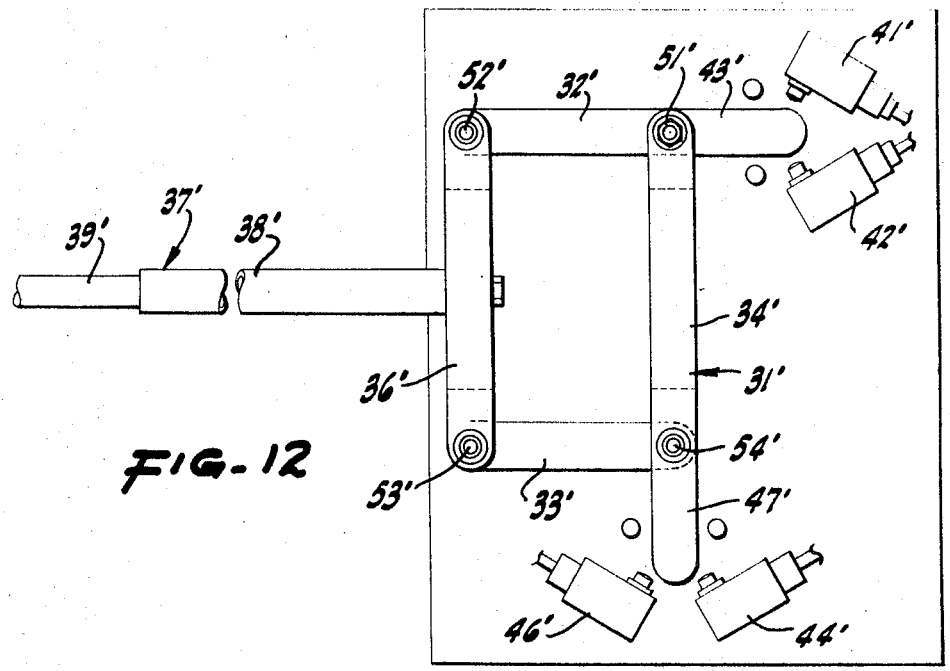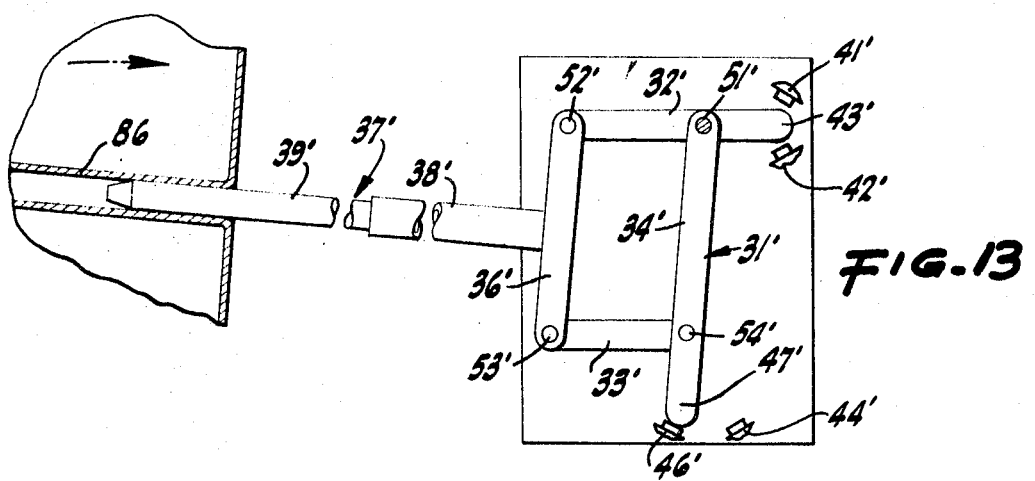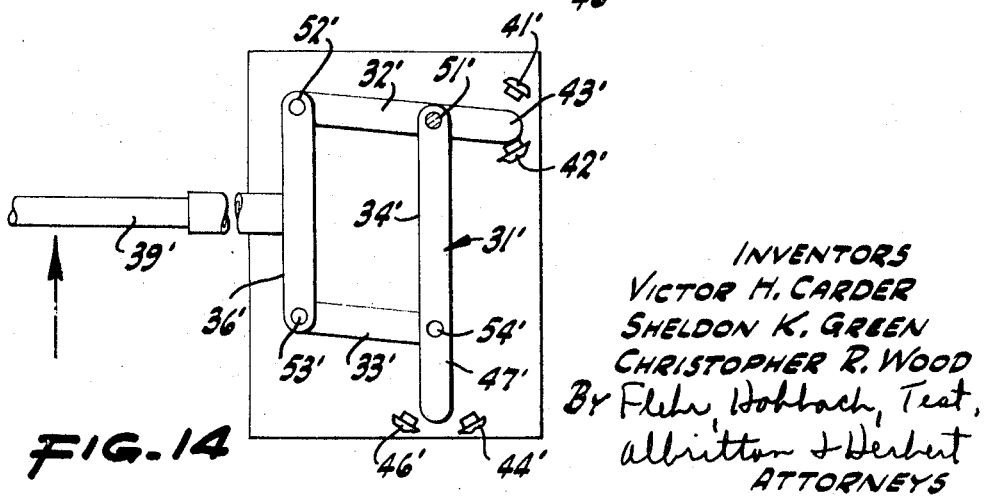

3,599,262

ATTITUDE SENSING SYSTEM FOR USE DURING LOADING AND UNLOADING OF VEHICLES

BACKGROUND OF THE INVENTION

1. Field of the Invention

This invention relates to the field of loading and unloading vehicles. More particularly, this invention relates to the field of properly orienting a loading bridge or platform relative to a vehicle being loaded or unloaded to insure automatic and proper positioning of the bridge relative to the access door of the vehicle through which cargo or passengers are passing. Still more particularly, this invention relates to the field of devices for sensing changes in the attitude of a vehicle, such as an aircraft, during loading and unloading thereof and for automatically effecting corresponding changes in the orientation of a loading bridge used in conjunction with the vehicle during such loading and unloading. Specifically, this invention relates to the field of electromechanical mechanisms for detecting changes in vehicle elevation and angular attitudes and reacting in response to such changes to produce corresponding changes in the orientation of a loading bridge.

2. Description of the Prior Art

Heretofore it has been generally known to utilize automatic or manual systems for leveling an aircraft loading or unloading platform in accordance with changes in elevational attitude of a vehicle being loaded, such as an aircraft. Examples of such leveling systems known heretofore are disclosed in the Moore U.S. Pat. No. 3,038,185, Lodjic et al. U.S. Pat. No. 3,086,152, and Preiss U.S. Pat. No. 3,310,823. However, automatic leveling arrangements for loading and unloading platforms of the type characterized by the patents noted have been limited in their adaptability in that they are only responsive to elevational attitude changes. That is, such known systems sense attitude changes only in the vertical direction and possess no capability to sense and react to angular (roll) attitude changes.

Systems of the type noted in the listed patents, and other automatic leveling systems known heretofore, have not had the dual sensing capability characteristic of the present invention. That is, so far as is known, neither patented nor commercially available leveling systems known heretofore have been able to compensate automatically for both elevational attitude changes and angular displacement changes (roll) of a vehicle, such as an aircraft, during loading or unloading thereof.

The dual mode sensor system of the present invention insures that a loading bridge will be automatically reoriented in accordance with either elevational attitude changes, roll attitude changes, or both simultaneously, as the attitude of a vehicle being loaded or unloaded is altered. So far as is known, the present invention is the first devised to provide such dual attitude changes sensing capability in a simple and compact attitude sensing system.

SUMMARY OF THE INVENTION

This invention relates to an improved sensing system for detecting and compensating automatically for changes in the elevation and/or angular displacement (roll) attitude of a vehicle during loading or unloading thereof. More particularly, this invention relates to a sensing unit utilizable in conjunction with a loading bridge or platform to be positioned at an access door of a vehicle during loading or unloading thereof for insuring correct positioning of the bridge in response to changes in attitude of the vehicle. Still more particularly, this invention relates to an electromechanical linkage mechanism in an attitude sensing unit for detecting attitude changes in a vehicle being loaded or unloaded and transmitting control signals in response to its sensing function to means for changing the orientation of a loading bridge used during such loading or unloading.

The present invention is an improvement over prior known loading bridge leveling systems in that it automatically senses changes in both elevational and roll attitudes of a vehicle being loaded or unloaded and automatically compensates for such elevational or roll attitude changes separately or jointly with each other. Prior known leveling arrangements had only elevational attitude change sensing capability.

While the particular sensing system disclosed herein is described specifically in conjunction with loading and unloading of an aircraft, and while such a system has particular utility in conjunction with aircraft loading and unloading, it should be understood that the novel features hereof are equally applicable to utilization in conjunction with loading and unloading of other cargo carrier-type vehicles or cargo storage structures which are subject to changes in elevational attitude and angular displacement about a longitudinal axis during such loading and unloading. Accordingly, reference made herein to loading and unloading an aircraft should be interpreted in the broader sense as contemplated above.

From the foregoing, it should be understood that objects of this invention include the provision of an improved sensing system for use in conjunction with loading or unloading a cargo carrier vehicle such as an aircraft; the provision of an improved sensing device for detecting changes in attitude of a cargo carrier vehicle being loaded or unloaded and automatically effecting changes in the orientation of a loading bridge used in conjunction with the vehicle; the provision of an improved electromechanical sensing and control system for selectively orienting a loading bridge used during loading and unloading of a cargo carrier vehicle; and the provision of an improved attitude sensor arm-linkage mechanism which is activated by and responsive to changes in the elevational or roll attitude of a vehicle being loaded or unloaded so that automatic compensation for such attitude changes is effected in a loading bridge used in conjunction with the vehicle.

These and other objects of this invention will become apparent from a study of the following description taken in conjunction with the attached drawings.

BRIEF DESCRIPTION OF THE DRAWING

FIG. 1 is a generally schematic view showing the operative interrelationship between an aircraft, a loading bridge, and the sensing device embodied in the present invention.

FIG. 2 is a front elevational view, partly in section, showing the positioning of the sensing device on the loading bridge.

FIG. 3 is a side elevational view showing the mounting arrangement for the sensing device on the loading bridge.

FIG. 4 is a side elevational view of an adapter assembly employed to operatively interconnect the sensing device with the threshold of the aircraft access door.

FIG. 5 is a vertical sectional view through the adapter assembly taken in the plane of line 5–5 of FIG. 4.

FIG. 6 is a generally schematic view partially in section illustrating a modified arrangement for operatively interconnecting the sensing device with the aircraft.

FIG. 12 is a generally schematic view of a modified and somewhat simplified linkage arrangement embodying the present invention.

FIGS. 13 and 14 are generally schematic views of the modified linkage mechanism of FIG. 12 shown in various attitude sensing orientations.

DESCRIPTION OF THE PREFERRED EMBODIMENTS

Figure 7:
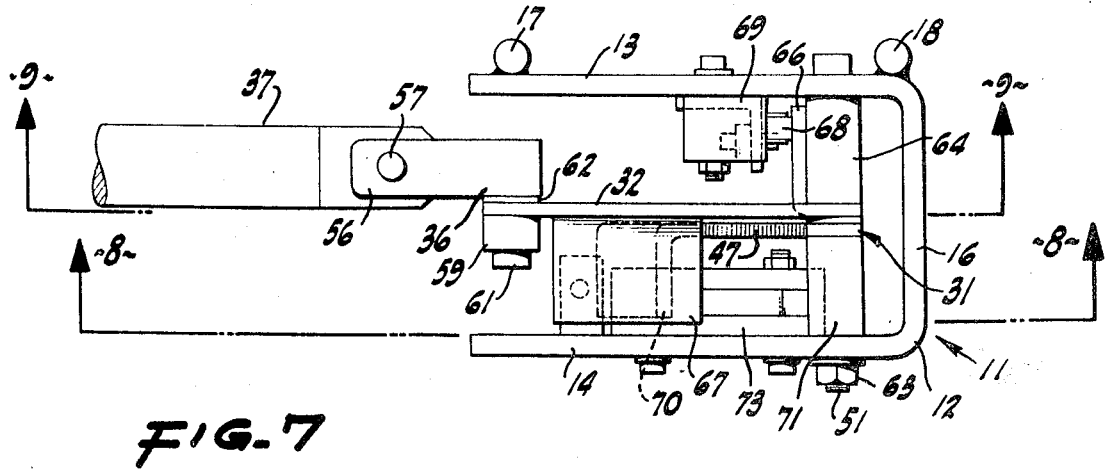
FIG. 7 is a plan view of one embodiment of the sensing device illustrating details of the linkage structure thereof.

Attention is directed hereinafter to use of the present attitude change sensing system in conjunction with the loading and unloading of an aircraft. However, as noted previously, this system is utilizable in conjunction with loading and unloading of other vehicles or storage structures in which the elevational and/or roll attitude may vary during such loading and unloading.

As seen in FIG. 1 an aircraft, generally designated 1, having an access door 2 in the fuselage thereof has a loading platform or bridge, generally designated 3, positioned adjacent the aircraft so that cargo or passengers may enter or exit from the aircraft through the access door. In the arrangement shown, the loading bridge is of the conveyor type designed to handle cargo, such as luggage pods and containers and the like, but it should be understood that a passenger loading bridge also may utilize the novel concepts of this invention.

In the arrangement shown, loading bridge 3 includes means for conveying cargo into or out of the aircraft comprising a series of inverted casters or rollers 4 over which the cargo rides. Guide rails 6 extend along opposite margins of the bridge to maintain cargo on the bridge during movement thereacross. The bridge includes an extensible and retractable scissors supporting structure 7 of known construction.

Secured to the loading bridge adjacent the front end or nose thereof and adapted to be positioned in contact with the threshold of the access door of the aircraft is the improved sensing device of this invention, generally designated 11, as seen in FIGS. 2 and 3. In that regard, the sensing device may include an enclosure or housing which completely surrounds the working mechanism thereof, or, as noted from FIGS. 7 through 9, the device may include a generally U-shaped open housing 12 having generally parallel opposed sidewalls 13 and 14 interconnected with each other by an integral base wall 16.

Secured to sidewall 13, by welding or other suitable means, are a pair of laterally spaced mounting bolts 17 and 18 which project beyond the top margin of the housing and define means for mounting the device on the loading bridge 3. In that regard, as seen in FIGS. 2 and 3, bolts 17 and 18 are utilized to secure the sensing device 11 to the bridge by passing the bolts through suitable holes provided therefor in an angle bracket 19 secured along the underside of the bridge framework adjacent the front end thereof. By employing nut-type fasteners in conjunction with the mounting bolts, separation of the bolts from the angle bracket is precluded.

The purpose of the sensing device, as will be described in greater detail hereinafter, is to recognize when changes in the elevational and/or roll attitude of the aircraft occur during loading and unloading. Control signals are transmitted in response to such sensing to means for changing the orientation of the loading bridge upon such attitude changes being noted. Thus, should the aircraft roll during uneven loading thereof, the nose of the loading bridge may be elevated or lowered (tilted) as required to compensate for such change in roll attitude in accordance with the direction of such roll. Similarly, should the elevational attitude of the aircraft change, that is, should the horizontal plane of the aircraft cargo support surface rise or fall in uniform planes parallel to the ground surface upon which the aircraft is supported, the loading bridge may be uniformly elevated or lowered without nose tilting. Similarly, joint elevational and roll attitude changes may be sensed and compensated for by the subject device by changing the elevation of the loading bridge and also the degree of tilt of its nose end.

In that regard, the position of the loading bridge relative to the threshold of the access door is maintained so that the upper plane of the cargo transfer surface of the loading bridge is maintained generally even with the cargo support surface within the aircraft. The position of the cargo bridge may be altered in known fashion by utilizing selectively one or both of a pair of hydraulic piston and cylinder structures, designated 26 and 27, respectively in FIG. 1. Each of the piston and cylinder structures is dual directional so that the piston of each structure may be extended or retracted selectively relative to the cylinder thereof in response to actuation of a fluid control valve associated therewith in known fashion. Thus, it will be understood that if both piston and cylinder structures 26 and 27 are simultaneously actuated to move both pistons in the same direction, the loading bridge may be uniformly elevated or lowered in a plane which is retained generally parallel to the surface of the ground upon which the loading bridge is supported. Thus, selective adjustment for elevational attitude changes of the aircraft can be made. Conversely, if only the piston and cylinder structure 26 positioned adjacent the nose of the loading bridge is actuated, the nose of such bridge may be elevated or lowered selectively to incline or tilt the upper conveyor surface of the bridge. Thus, selective compensation may be made for changes in roll attitude of the aircraft.

The subject sensing device includes control means for selectively actuating one or both of the piston and cylinder structures 26 and 27 in the manner noted in response to changes in attitude of the aircraft sensed by the device. Preferably, such control means includes conventional electrical microswitch control assemblies which automatically effect changes in the elevational or angular orientation of the loading bridge by transmitting control signals to the fluid control valves which regulate the pistons of structures 26 and 27 as will be described.

It should be understood that, in addition to the control switch assemblies utilized in conjunction with the sensing device, the loading bridge includes accessible manually operable control mechanisms (not shown) for selectively actuating the piston and cylinder structures for elevating and tilting the loading bridge to the desired initial orientation when the loading bridge is first aligned with the threshold of an aircraft to be loaded or unloaded. However, when such initial alignment has been effected and the sensing device has been operatively connected with the aircraft, no manual adjustments of the position of the loading bridge thereafter is required under normal circumstances because the sensing device effects automatically any reorientation of the loading bridge which becomes necessary.

Although the system of this invention is designed to function automatically without manual intervention, it is contemplated that, under certain specific circumstances, the sensing device may be utilized to actuate intermediate signal lights or other warning devices rather than effecting direct alteration of the bridge position. In such cases, the signal devices would be operator attended and the operator would manually actuate control mechanisms to effect reorientation of the loading bridge as desired. While the automatic system disclosed herein is preferred under most circumstances, the manual control system also may be desirably used for specific loading operations.

Figure 8:
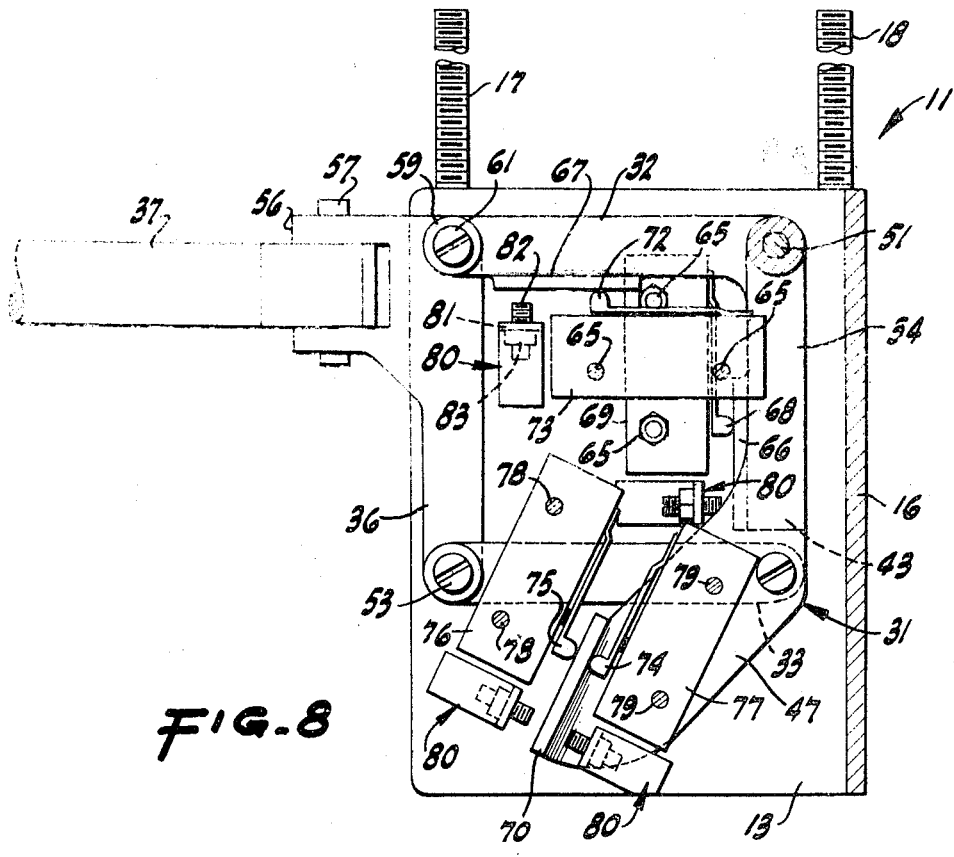
FIG. 8 is a vertical sectional view through the sensing device taken generally in the plane of line 8–8 of FIG. 7.
Figure 9:
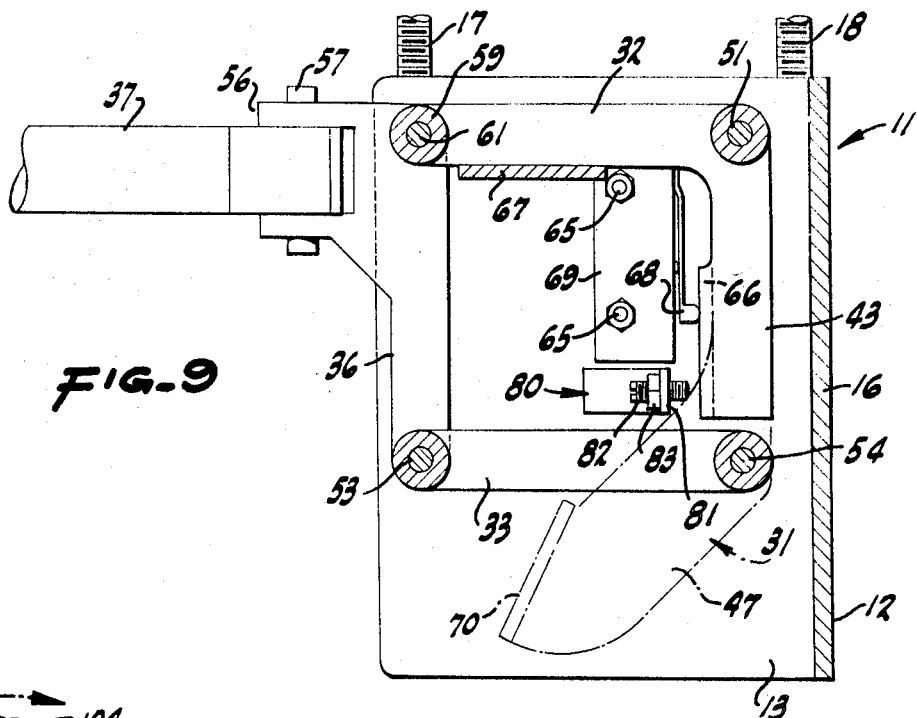
FIG. 9 is a vertical sectional view through the sensing device taken in the plane of line 9–9 of FIG. 7.
Figure 10:
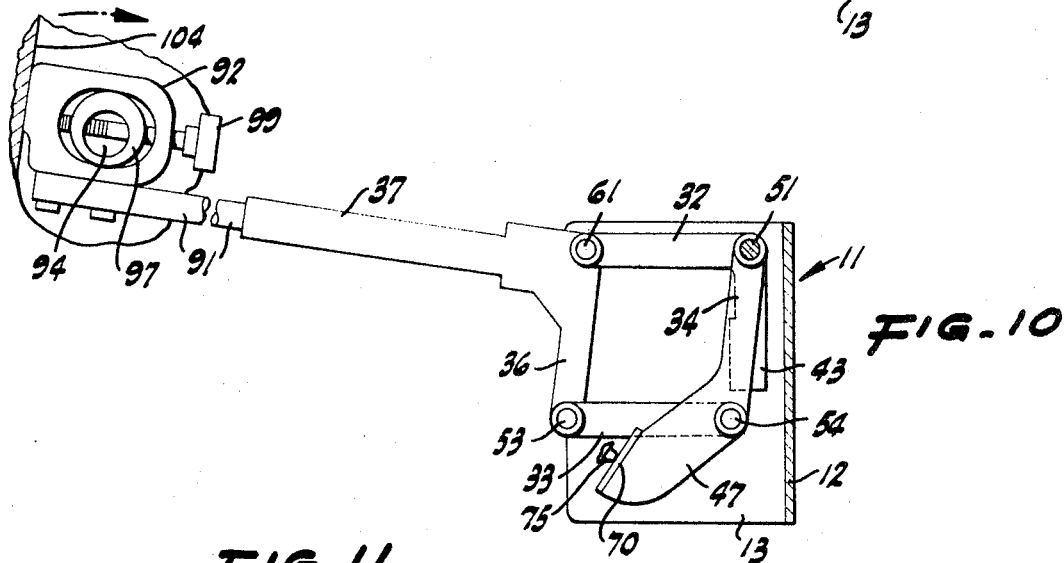
FIGS. 10 and 11 are simplified generally schematic views of the linkage mechanism of the subject device positioned in various attitude sensing orientations.
Figure 11:
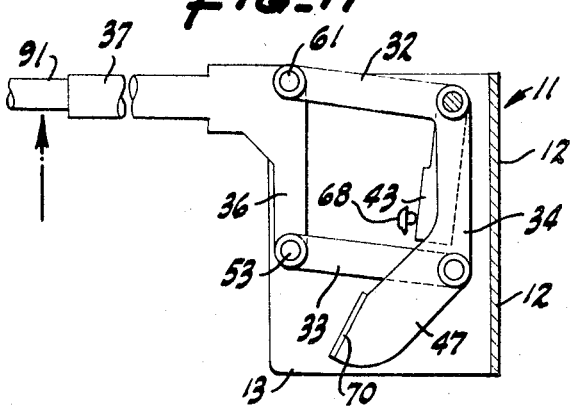

Before describing details of the preferred commercial embodiment of this invention illustrated in FIGS. 7 through 9, reference is directed to the generally schematic showing of a somewhat simplified linkage arrangement for the subject sensing device shown in FIGS. 12 through 14. The construction shown in those figures is usable under most circumstances but the commercial embodiment of FIGS. 7 through 9 to be described is somewhat more advantageously employed because it presents a more compact unit than does the arrangement shown in FIGS. 12 through 14. In the generally schematic showing of those latter figures, a housing has been omitted for purposes of clarity of illustration. It should be understood, however, that a suitable housing and mounting arrangement of the type seen in FIGS. 2 and 3 normally would be employed in this embodiment also.

In FIGS. 12 through 14 reference numerals primed are used to identify components of the linkage mechanism which correspond to those of the device embodiment of FIGS. 7 through 9. In that regard, the alternate device 11' comprises a linkage mechanism generally designated 31' which is defined by two opposed pairs of bar or link members designated 32', 33', 34', and 36'. Each of link members 32' and 33' extends generally horizontally and is positioned in a plane which lies parallel to the other under normal circumstances. Links 34' and 36' similarly are oriented in generally parallel planes but such links extend generally vertically between and are operatively interconnected with the first-mentioned pair of horizontal links 32' and 33'.

A extensible and retractable sensor arm 37' includes an inner enlarged section 38' which is secured directly to the vertical link 36' in any suitable fashion, such as by bolting or welding. Sensor arm 37' includes an outer smaller section 39' telescopically receivable within arm section 38'. Outer arm section 39' is extensible beyond the end of the loading bridge with which the device is attached so as to be operatively engageable with the aircraft threshold. In that regard, the arrangement shown in FIGS. 12 through 14 is illustrated operatively engaged with the aircraft in the alternate manner shown in greater detail in FIG. 6. However, by eliminating the outer sensor arm section 39', the embodiment of FIGS. 12 through 14 may also be operatively connected with the aircraft threshold by employing the adapter assembly arrangement shown in FIGS. 4 and 5.

Control switch means are provided in conjunction with the upper horizontal link 32' and vertical link 34'. Such control switch means comprise a first pair of microswitches 41' and 42' of conventional construction positioned to be selectively engaged under certain circumstances by an extension 43' of horizontal link 32'. Similarly, a second pair of microswitches 44' and 46' of conventional construction are positioned to be selectively engaged under certain circumstances by an extension 47' of vertical link 34'. It will be understood that, depending upon the direction in which either of the link extensions 43' or 47' is moved when the sensing device is actuated, one of the switches of each of the respective pairs will be contacted by such link extension. Thus, a control signal may be transmitted by such switch to an appropriate control valve to effect reorientation of the loading bridge by actuating the appropriate piston and cylinder structure 26 or 27 as mentioned previously.

In that regard, through a suitable and conventional electrical control wiring system of the type well known (not shown), when link extension 43' is moved downwardly in FIG. 14 to contact switch 42' in response to upward movement of the sensor arm 37', switch 42' transmits a signal to the control valves of both piston structures to cause the loading bridge to be moved uniformly upwardly without changing its plane of orientation relative to the ground support surface. Conversely, if switch 41' is contacted by link extension 43' in response to downward movement of sensor arm 37', switch 41' will effect actuation of both of the cylinder and piston structures to move the loading bridge uniformly downwardly without changing its plane of orientation relative to the ground support surface.

If switch 46' is contacted by link extension 47' in response to tilting movement of sensor arm 37' at an upwardly directed inclination as seen in FIG. 13, only the piston and cylinder structure 26 controlling the nose end of the loading bridge will be actuated thereby to effect raising of the nose of the loading bridge. Similarly, if switch 44' is contacted by link extension 47' in response to tilting movement of sensor arm 37' in the downward direction, the piston and cylinder structure 26 will be actuated to lower the nose of the loading bridge.

Thus, with the four link arrangement shown, selective and automatic positioning and reorientation of the loading bridge may be directly effected in response to changes in aircraft attitude. In that regard, the linkage mechanism shown is mounted for pivotal movement as a unit about a single fixed pivot point, defined by pivot pin 51'. Such pivot pin extends into and is supported by the wall of the housing in which the linkage is positioned. Pivot pin 51' extends through the upper horizontal link 32' intermediate its ends and through the upper end of vertical link 34'.

The remaining links are pivotally interconnected with each other by a series of pivot pins 52', 53', and 54' which extend through contacting portions thereof as seen in FIG. 12 and are retained in engagement with such contacting portions so that relative pivotal movement between contacting links may be easily effected in response to movement of sensor rod 37'.

By way of further example, and referring to FIG. 13, it will be understood that if sensor arm 37' is tilted so that its axis extends upwardly in response to a change in roll attitude of the aircraft, the respective links of the sensing device will take the position shown in FIG. 13. That is, upward canting of the sensor arm in accordance with tilting of a socket 86 secured to the aircraft in which the arm is received will effect pivotal movement of horizontal link 36' about the axis of pivot pin 52'. Such movement in turn will urge lower horizontal link 33' towards the left to carry the other vertical link 34' therewith about axis of pin 51' so that link extension 47' will contact limit switch 46' which in turn will transmit a control signal to effect raising of the nose of the loading bridge. Aircraft roll displacement in the opposite direction from that shown in FIG. 13 will cause link extension 47' to pivot in the opposite direction from that seen in FIG. 13 to contact limit switch 44' and to effect the reverse tilting movement of the nose of the loading bridge, namely lowering thereof.

As seen in FIG. 14, when the aircraft rises during unloading so that the plane of its cargo supporting surface moves upwardly uniformly in response to uniform unloading of the same, sensor rod 37' will move upwardly uniformly (without tilting) so that its axis remains generally parallel to the plane of the ground supporting surface upon which the aircraft is resting. Such parallel upward movement will effect pivotal movement of the upper horizontal line 32' about the fixed pivot axis 51' without altering the vertical orientation of link 34'. Such pivotal movement of link 32' will cause extension 43' thereof to strike limit switch 42' which in turn will actuate both piston and cylinder structures 26 and 27 to cause the loading bridge to move upwardly uniformly without changing its angular orientation. Conversely, during uniform loading, as the aircraft elevational attitude changes to a lower elevation, link extension 43' will move in the direction opposite to that shown in FIG. 14 to contact the other limit switch 41' to effect lowering of the bridge uniformly without changing its angular orientation.

It should also be understood that the embodiments of the sensing device contemplated herein have the capability of simultaneously changing both the elevational and angular orientation of the loading bridge in response to both elevational and roll displacement of the aircraft. Under such circumstances, the linkage arrangement of the sensing system will effect simultaneous movement of link extensions 43' and 47' about the fixed pivot 51' and about the respective movable pivots of the linkage to contact one of each of the pair of limit switches positioned adjacent such extensions so that simultaneous changes in the elevational and angular orientation of the loading bridge will be effected.

In the commercial embodiment shown in detail in FIGS. 2, 3, and 7 through 9, sensor arm 37 is defined by a construction different from the telescopically interengaged sections described previously with respect to FIGS. 12 through 14. Such difference in construction is prompted by the adapter assembly shown in FIGS. 4 through 6 by which the sensing device 11 is preferably connected with the aircraft threshold. Sensor arm 37 comprises only one hollow tubular elongated section 38 which is to be operatively interposed between the aircraft door threshold and a four bar linkage mechanism within housing 12, as best seen in FIGS. 8 and 9. Such linkage mechanism is functionally the same as the linkage 11' described previously.

In that regard, the inner end of sensor arm section 38 is operatively connected with a vertically extending link 36 which has a clevis portion 56 at one end thereof between the arms of which the sensor arm is positioned. A pin 57 extends vertically through the interengaged portions of the sensor arm 37 and link 36 to preclude separation thereof. Relative rotation in a horizontal plane between those interengaged portions is permitted by such pin 57 to facilitate interengagement of the sensor arm with the adapter assembly to be described by which the sensing device is operatively connected with the aircraft threshold. Pivotally connected with vertical link 36 is an upper horizontal link 32 having an enlarged boss 59 on one end thereof through which a bolt-type pivot pin connector 61 extends through the boss into engagement with the vertical link 36 as best seen in FIG. 7. A washer 62 is interposed between the adjacent portions of the vertical and horizontal links as also seen in FIG. 7 and similar washers are employed between other relatively rotatable components of the linkage as required.

Intermediate its opposite ends, horizontal link 32 is pivotally mounted on a fixed pivot defined by an elongated headed pivot pin 51 which extends through the opposite sidewalls 13 and 14 of housing 12 and is held in place therein by a nut-type fastener 63. Link 32 includes a second cylindrical boss 64 which surrounds pivot pin 51 and which has integral therewith and depending therefrom a generally vertically extending link extension 43 having a laterally offset switch trip section 66 projecting therefrom as best seen in FIGS. 7 and 8. Adjacent its first-mentioned end, horizontal link 32 has a second offset trip switch section 67 extending laterally therefrom as seen in FIGS. 7 and 8.

The offset link section 66 and 67 are oriented to engage respectively a switch contact arm 68 of switch 69 secured to the sidewall 13 of the housing by bolts 65 as noted from FIG. 8 and switch contact arm 72 of switch 73 secured by bolts 65 to the opposite sidewall 14 of the housing. Thus, upon pivotal movement of horizontal link 32 about the fixed pivot axis 51, one or the other of the offset switch trip sections 66 or 67 will contact its associated limit switch to actuate the hydraulic piston and cylinder means of the loading bridge in the manner described previously.

The lower end of vertical link 36 has one end of a second horizontal link 33 pivotally connected therewith by means of a pivot pin 53 positioned therethrough. At its opposite end, the second horizontal link 33 is pivotally connected by means of a pivot pin 54 intermediate the opposite ends of a second generally vertically extending link 34. Vertical link 34 in turn is mounted at its upper end on the aforementioned fixed pivot pin 51 by means of an enlarged boss 71 which surrounds the pivot pin 51. Thus, upon actuation of horizontal link 33 towards the right or left when viewed in FIG. 8, vertical link 31 will be rotated clockwise or counterclockwise about the axis of fixed pivot pin 51.

Vertical link 34 includes an angularly oriented extension 47 which terminates in a laterally offset switch trip section 70 as best seen in FIGS. 8 and 9. Such offset extension is interposed between the contact arms 74 and 75 of two limit switches 76 and 77 secured by suitable fasteners 78 and 79 with the inner sidewall 14 of the housing.

The linkage arrangement shown in FIGS. 7 through 9 in which the link extensions 43 and 47 are angularly offset relative to their associated links 32 and 31 permits the linkage to be incorporated into a more compact assembly than is possible for a system using comparable size links which utilize in-line extensions of the type shown in the modified arrangement of FIGS. 12 through 14. However, operation of the embodiment just described corresponds to that described previously with respect to arrangement shown in FIGS. 12 through 14 in that actuation of the respective limit switches in response to up or down or inclined canted movement of the sensor arm 37 will result in corresponding reorientation of the linkage mechanism to produce the control effect desired on the orientation of the aircraft loading bridge.

To preclude damage to the switch mechanisms should the sensor arm 37 be moved too far in a given direction, stop means preferably is provided in conjunction with each of the offset trip switch sections 66, 67 and 70 of the respective links. As best seen in FIG. 8, such stop means are generally designated 80 and each is defined by a housing segment 81 partially severed and bent inwardly relative to a given wall of the housing. Through each such segment is positioned a setscrew 82 having a position retaining nut 83 engaged therewith. Thus, by adjusting the position of the setscrew end relative to an associated switch trip section of a link, over travel of the link may be precluded so that damage to an associated switch may be precluded.

As noted previously, the sensor arm of the respective linkage mechanisms described preferably is operatively engaged with the aircraft directly at or closely adjacent to the threshold of the access door. Several arrangements may be utilized in that regard depending upon the construction of the sensor arm and the configuration of the aircraft. If an extensible sensor arm of the type shown in FIG. 13 is employed, a simplified arrangement such as shown in FIG. 6 may be employed. However, if modification of the aircraft door threshold in the manner required by the FIG. 6 arrangement is not desired, an adapter assembly of the type shown in FIGS. 4 and 5 may be employed which does not utilize an extensible sensor arm.

As seen in FIG. 6, the extensible end 39' of an extensible sensor arm 37' may be engaged directly in a socket 86 formed directly in and secured to the aircraft door threshold. The socket is dimensioned to snugly receive the sensor arm therein with minimum play or movement therebetween. Thus, upon movement of the aircraft which changes its elevational or roll attitude as described previously, motion will be transmitted directly by the sensor arm to the linkage mechanism for effecting the described control functions.

FIGS. 4 and 5 show an alternate arrangement for operatively interengaging the sensor arm with the aircraft access door threshold which requires no special alteration or adaptation of the door or its frame. Such figures illustrate an adapter assembly for accommodating a sensor arm 37 of the type embodied in the sensing device of FIGS. 7 through 9 in which only a single hollow tubular sensor arm section 38 is employed.

As seen in FIGS. 4 and 5, the adapter assembly illustrated includes an elongated rigid rod 91 to be operatively positioned to project outwardly from the aircraft threshold. Such rod 91 is to be slidably received within the tubular sensor arm section 37 as seen thereby to operatively connect the adapter assembly and the sensing device linkage mechanism through the sensor arm. Rod 91 is rigidly connected with a hollow tubular bracket 92 by bolts 93 or other suitable connecting means, such as welding. Bracket 92 in turn is securely and operatively connected with the aircraft door threshold.

In that regard, it is common for aircraft door frames to include cylindrical spools of the type shown at 94 which project inwardly towards each other from opposite margins of the door frame. It is to such a spool that the adapter assembly is secured. To that end, bracket 92 is provided with a cylindrical through bore 96 in which is positioned a hollow connector 97 which also has a cylindrical through bore 98 therein. The diameter of bore 98 corresponds generally to the diameter of and receives therein spool 94 which is located most closely adjacent the base of the aircraft door frame which defines the door threshold.

The adapter assembly further includes a threaded thumbscrew 99 which extends through diametrically opposed openings 100 and 101 formed in connector 97. The latter opening 101 is threaded to threadedly engage the shank of the thumbscrew extending therethrough. However, the opening 100 is unthreaded so that the thumbscrew may pass therethrough.

The end 102 of the shank of thumbscrew 99 engages the inner periphery of bore 96 of bracket 92 so that, as the thumbscrew is rotated within the connector 97, the connector may be forced away from that portion of the bracket bore engaged by the thumbscrew shank end.

Thus, connector 97 and in turn bracket 92 may be securely positioned and held on spool 94 with which the adapter assembly is engaged. In that regard, it should be understood that the bracket has its end 103 positioned in contacting relationship with a plate 104 defining a portion of the door threshold. Thus, when the connector 97 is engaged with spool 94, movement of connector relative to the bore of the bracket 92 by turning screw 99 urges the end 103 of the bracket into secure engagement with the door threshold, thus holding the adapter assembly securely in place and thereby insuring secure operative interengagement of rod 91 with the sensor arm 37 in the manner described.

It will also be noted from FIGS. 4 and 5 that connector 97 has its bore 98 oriented axially off center, thereby imparting an eccentric configuration to the connector. The purpose of such eccentric construction is to permit the adapter assembly to be utilized with more than one door threshold construction. For example, in certain aircraft having more than one access door through which cargo is to be loaded or unloaded, the lowermost spool 94 with which the adapter assembly is to be operatively engaged is somewhat differently positioned relative to the threshold plate 94 with which the bracket is to be engaged. That is, in one door spool 94 is slightly closer to the plate 104 and in other doors the spool is spaced slightly farther therefrom. To permit the adapter assembly to be utilized with both such doors, the eccentric connector has been devised. By removing the thumbscrew from engagement with the connector and reorienting the connector within the bracket 180° from the position shown, the connector is then properly oriented to accommodate therein a spool 94 of the other type door frame.

Having thus fully described preferred embodiments of an improved invention for sensing changes in the elevational and roll attitudes of an aircraft during loading and unloading thereof, reference is directed to the appended claims for the scope of protection to be afforded thereto.

We claim:

1. A system for compensating for changes in the elevational or roll attitude of a cargo carrier during loading or unloading thereof, comprising in combination a loading bridge to be oriented adjacent an access door of said carrier in alignment with the threshold thereof; and a device mounted on said bridge for sensing changes in both the elevational and roll attitude of said carrier during such loading or unloading so that changes in the orientation of said bridge may be effected in accordance with said attitude changes, comprising a sensor arm operatively engaged with said carrier threshold during such loading and unloading, the position of said arm being altered in accordance with changes in the elevational or roll attitude of said carrier, limit switches selectively actuatable in response to movement of said arm in response to attitude changes of said carrier, said switches being operatively connected with and controlling means for selectively changing the height or angle of the plane of said bridge, and linkage mechanism including switch trip sections for engaging and selectively actuating said switches in predetermined fashion, said linkage mechanism being connected with and actuatable by said sensor arm.

2. The system of claim 1 in which said sensor arm engages a portion of an adapter assembly at the free end thereof, said assembly being engageable with said threshold of said carrier door for transferring motion from said carrier to said sensor arm during changes in the elevational or roll attitude of said carrier.

3. The system of claim 2 in which said adapter assembly includes a bracket to be secured to said carrier door threshold, and an elongated rod extending from said bracket; and in which said sensor arm is of hollow tubular construction to receive said adapter rod therein.

4. The system of claim 1 in which the free end of said sensor arm is receivable directly in and interengaged with a socket provided therefor in said threshold of said carrier door.

5. The system of claim 1 in which said linkage mechanism comprises a four bar linkage which is pivotally mounted upon a single fixed pivot.

6. The system of claim 5 in which said linkage comprises cooperable pairs of opposed horizontal and vertical links, one end portion of one of each of said horizontal and vertical links being pivotally mounted on said fixed pivot, opposite end portions of the respective links being pivotally connected with each other, said linkage being pivotal as a unit about said fixed pivot with the individual links thereof being pivotal relative to a link connected therewith.

7. The system of claim 6 in which one of each of said horizontal and vertical links includes a switch trip extension thereon for selectively engaging a control switch when its associated link is pivoted by said linkage in response to movement of said sensor arm.

8. The system of claim 7 in which each of said switch trip extension is angularly offset relative to its associated link to permit said linkage to be mounted in a compact housing.

9. For use in a system for compensating for changes in the elevational or roll attitude of a cargo carrier during loading or unloading thereof in combination with a loading bridge to be oriented adjacent an access door of said carrier in alignment with the threshold thereof; a device to be mounted on said bridge for sensing changes in both the elevational and roll attitude of said carrier during such loading or unloading so that changes in the orientation of said bridge may be effected in accordance with said attitude changes, comprising a sensor arm to be operatively engaged with said threshold during such loading and unloading, the position of said arm being altered in accordance with changes in the elevational or roll attitude of said carrier, limit switches selectively actuatable in response to movement of said arm in response to attitude changes of said carrier, said switches to be operatively connected with and controlling means for selectively changing the height or angle of the plane of said bridge, and linkage mechanism including switch trip sections for engaging and selectively actuating said switches in predetermined fashion, said linkage mechanism being directly connected with and actuatable by said sensor arm.

10. The sensing device of claim 9 in which said linkage mechanism comprises a four bar linkage which is pivotally mounted upon a single fixed pivot supported by a housing comprising part of said device.

11. The sensing device of claim 10 in which said linkage comprises two cooperable pairs of opposed horizontal and vertical links, one end portion of one of each of said horizontal and vertical links being pivotally mounted on said fixed pivot, opposite end portions of the respective links being pivotally connected with each other, said linkage being pivotal as a unit about said fixed pivot with the individual links thereof being pivotal relative to a link connected therewith.

12. The sensing device of claim 11 in which one of each of said horizontal and vertical links includes a switch trip extension thereon for selectively engaging a control switch when its associated link is pivoted by said linkage in response to movement of said sensor arm.

13. The sensing device of claim 12 in which each of said switch trip extensions is angularly offset relative to its associated link to permit said linkage to be mounted in a compact housing.

14. The sensing device of claim 11 in which said sensor arm is connected directly with that one of said vertical links of said linkage which is not direct pivotally mounted on said fixed pivot.